United States Patent
Bauchot et al.

(10) Patent No.: US 6,757,867 B2
(45) Date of Patent: Jun. 29, 2004

(54) METHOD AND SYSTEM IN AN ELECTRONIC SPREADSHEET FOR ADDING OR REMOVING ELEMENTS FROM A CELL NAMED RANGE ACCORDING TO DIFFERENT MODES

(75) Inventors: Frederic Bauchot, St Jeannet (FR); Albert Harari, Nice (FR)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 09/731,164

(22) Filed: Dec. 6, 2000

(65) Prior Publication Data

US 2001/0007988 A1 Jul. 12, 2001

(30) Foreign Application Priority Data

Jan. 6, 2000 (EP) .............................. 00480009

(51) Int. Cl.[7] .............................................. G06F 15/00
(52) U.S. Cl. ........................................ 715/504; 707/1
(58) Field of Search ................................ 715/504, 905, 715/503, 505, 511; 705/30; 707/1, 104.1

(56) References Cited

U.S. PATENT DOCUMENTS

| | | | |
|---|---|---|---|
| 5,418,898 A | | 5/1995 | Zand et al. .................. 395/137 |
| 5,633,998 A | * | 5/1997 | Schlafly ....................... 715/905 |
| 5,742,835 A | | 4/1998 | Kaethler ....................... 395/764 |
| 5,842,180 A | * | 11/1998 | Khanna et al. ................ 705/30 |
| 6,317,758 B1 | * | 11/2001 | Madsen et al. .............. 715/504 |

FOREIGN PATENT DOCUMENTS

EP    0569133 A2    10/1993    ........... G06F/15/20

* cited by examiner

*Primary Examiner*—Sam Rimell
(74) *Attorney, Agent, or Firm*—McGuireWoods LLP; John Pivnichny

(57) ABSTRACT

Some "summary" information in a cell named range is preserved when some spreadsheet elements rows, columns, or pages are added or removed from the cell named range. A range summary cell is defined by specifying in a table a range summary cell address. A range summary cell address is updated in the table according to the updated cell range address, and the range summary cell is moved according to the updated range summary cell address. The cell range address is updated in the table after the addition or the deletion of the spreadsheet element, and the range summary cell address is updated in the table according to the updated cell range address.

18 Claims, 9 Drawing Sheets

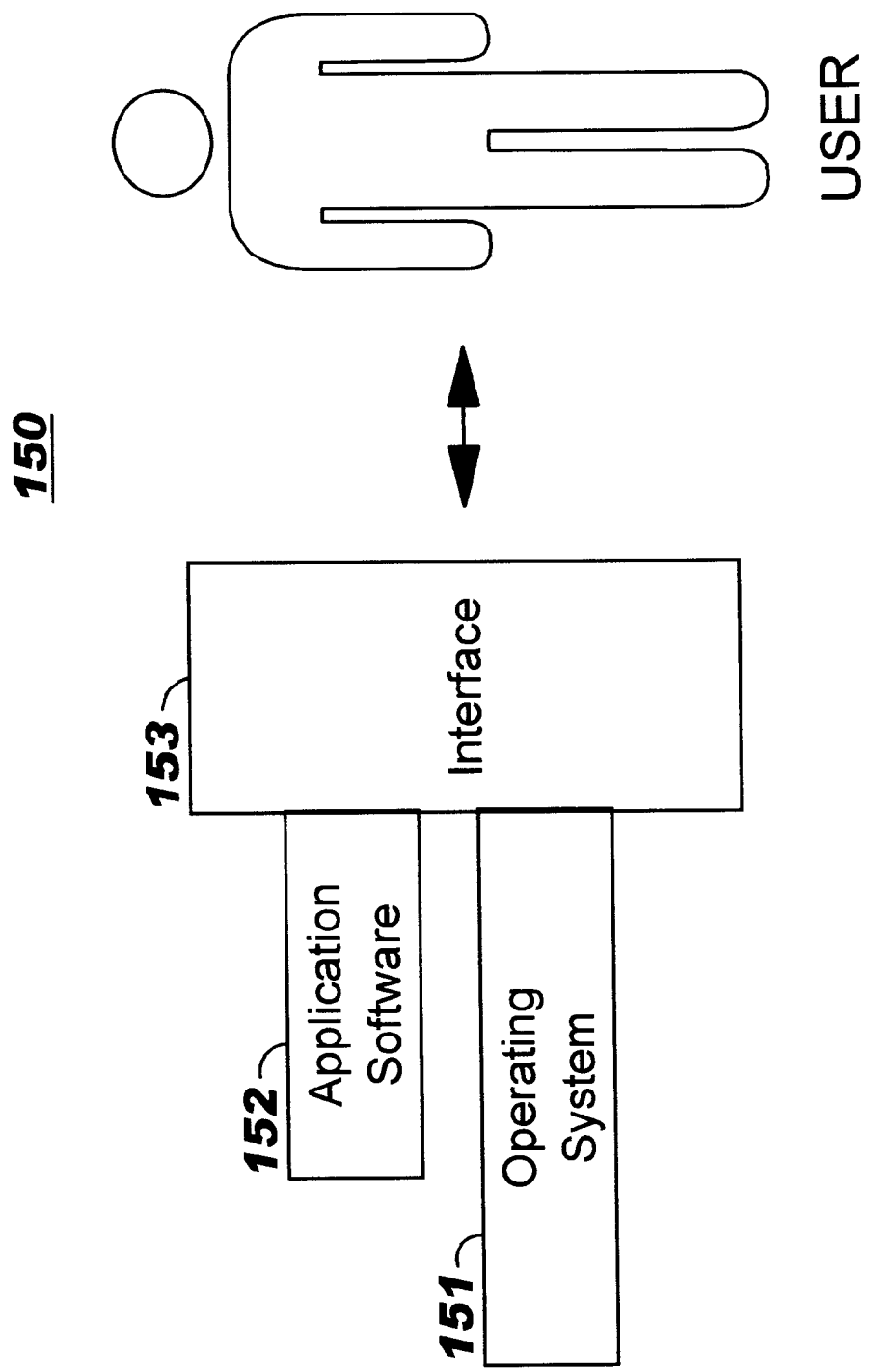

|   | A | B | C | D |
|---|---|---|---|---|
| 1 | COUNTRY | COUNTRY REVENUE | BRANCH | BRANCH REVENUE |
| 2 | USA | 6000 | Miami | 1000 |
| 3 |  |  | Boston | 2000 |
| 4 |  |  | Denver | 3000 |
| 5 | United Kingdom | 15000 | London | 4000 |
| 6 |  |  | Leeds | 5000 |
| 7 |  |  | Manchester | 6000 |
| 8 | TOTAL | 21000 |  |  |

FIG. 3B

|   | A | B | C | D |
|---|---|---|---|---|
| 1 | COUNTRY | COUNTRY REVENUE | BRANCH | BRANCH REVENUE |
| 2 | USA | 3000 | Miami | 1000 |
| 3 |  |  | Boston | 2000 |
| 4 |  |  | London | 4000 |
| 5 | United Kingdom | 15000 | Leeds | 5000 |
| 6 |  |  | Manchester | 6000 |
| 7 | TOTAL | 18000 |  |  |

FIG. 3C

|   | A | B | C | D |
|---|---|---|---|---|
| 1 | COUNTRY | COUNTRY REVENUE | BRANCH | BRANCH REVENUE |
| 2 | USA | 3000 | Miami | 1000 |
| 3 |  |  | Boston | 2000 |
| 4 |  |  | Leeds | 5000 |
| 5 |  |  | Manchester | 6000 |
| 6 | TOTAL | ERR |  |  |

FIG. 3D

|   | A | B | C | D |
|---|---|---|---|---|
| 1 | COUNTRY | COUNTRY REVENUE | BRANCH | BRANCH REVENUE |
| 2 | USA | 3000 | Miami | 1000 |
| 3 |  |  | Boston | 2000 |
| 4 | United Kingdom | 11000 | Leeds | 5000 |
| 5 |  |  | Manchester | 6000 |
| 6 | TOTAL | 14000 |  |  |

| Row | Column | Sheet | Associated Range |
|-----|--------|-------|------------------|
| 411 | 412    | 413   | 414 / 410        |
|     |        |       |                  |
|     |        |       |                  |

METHOD AND SYSTEM IN AN ELECTRONIC SPREADSHEET FOR ADDING OR REMOVING ELEMENTS FROM A CELL NAMED RANGE ACCORDING TO DIFFERENT MODES

TECHNICAL FIELD OF THE INVENTION

The present invention relates to the field of information processing by digital computers, and more particularly to a method and system, in an electronic spreadsheet, for preserving some "summary" information of a cell named range when some spreadsheet elements (like rows, or columns, or pages) are added or removed from the cell named range.

BACKGROUND ART

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a connex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., Using Quattro Pro 2, Borland-OsbomeIMcGraw-Mll, 1990; and LeBlond, G. and Cobb, D., Using 1–2–3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Named ranges used to automate the computations in a spreadsheet can evolve during the "life" of a spreadsheet just as some entries may be added to or deleted from a classical table found in an accountant's pad. Conventional spreadsheet tools offer some means for automatically adjusting the content of an existing named range when new elements (typically a new column, a new row or a new sheet) are added between elements already pertaining to the named range, or when some elements (typically a column, a row or a sheet) already pertaining to the named range are deleted. It is common to find in conventional spreadsheets some "summary" information, such as the sum of a given set of cells, or the average value of a given set of cells. When such a "summary" information is itself recorded within an element common to the named range it relates to, then the deletion of some elements (typically a column, a row or a sheet) may result in the disappearance of the "summary" information if this information is located within the deleted elements. Furthermore such a "summary" information may be referenced (for instance as the parameter of a formula) in another cell of the spreadsheet. In such a case, the disappearance of the "summary" information results in an "ERR" cell, translating the fact that conventional spreadsheets are not able to resolve the reference of a deleted cell. This limitation can be quite cumbersome in the frequent case where elements of a table must follow a predefined format imposing that such a range "summary" information be defined within elements shared with the range it relates to.

SUMMARY OF THE INVENTION

The present invention relates to the field of information processing by digital computers, and more particularly to a method and system, in an electronic spreadsheet, for preserving some "summary" information of a cell named range when some spreadsheet elements (like rows, or columns, or pages) are added or removed from said cell named range. The method of processing a range summary cell in a multi-dimensional spreadsheet comprising a plurality of cells identified by a cell address, comprises the steps of:
  defining a range summary cell by specifying in a table:
    a range summary cell address;
    a cell range address identifying an associated cell range said range summary cell address being a function of the specified cell range address;

In response to a user request for adding or deleting a spreadsheet element sharing a common cell address along at least one dimension with the cell range associated with the range summary cell:

updating in the table, the cell range address of the cell range associated with the range summary cell according to the user request;

updating in the table, the range summary cell address according to the updated cell range address;

moving in the spreadsheet, the range summary cell according to the updated range summary cell address;

adding or deleting the spreadsheet element according to the user request;

updating in the table, the cell range address after the addition or the deletion of the spreadsheet element;

updating in the table, the range summary cell address according to the updated cell range address.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1B is a block diagram of a software system including an operating system, an application software, and a user interface for carrying out the present invention;

FIG. 3 illustrates four different tables (FIGS. 3A, 3B, 3C and 3D) representing examples of Range Summary cells and conventional cells behavior upon row deletion;

FIG. 4 illustrates the structure of the Associate Range Table according to the preferred embodiment of the present invention;

DETAILED DESCRIPTION OF THE PREFERRED EMBODIMENT

System Hardware

Figure 1A:
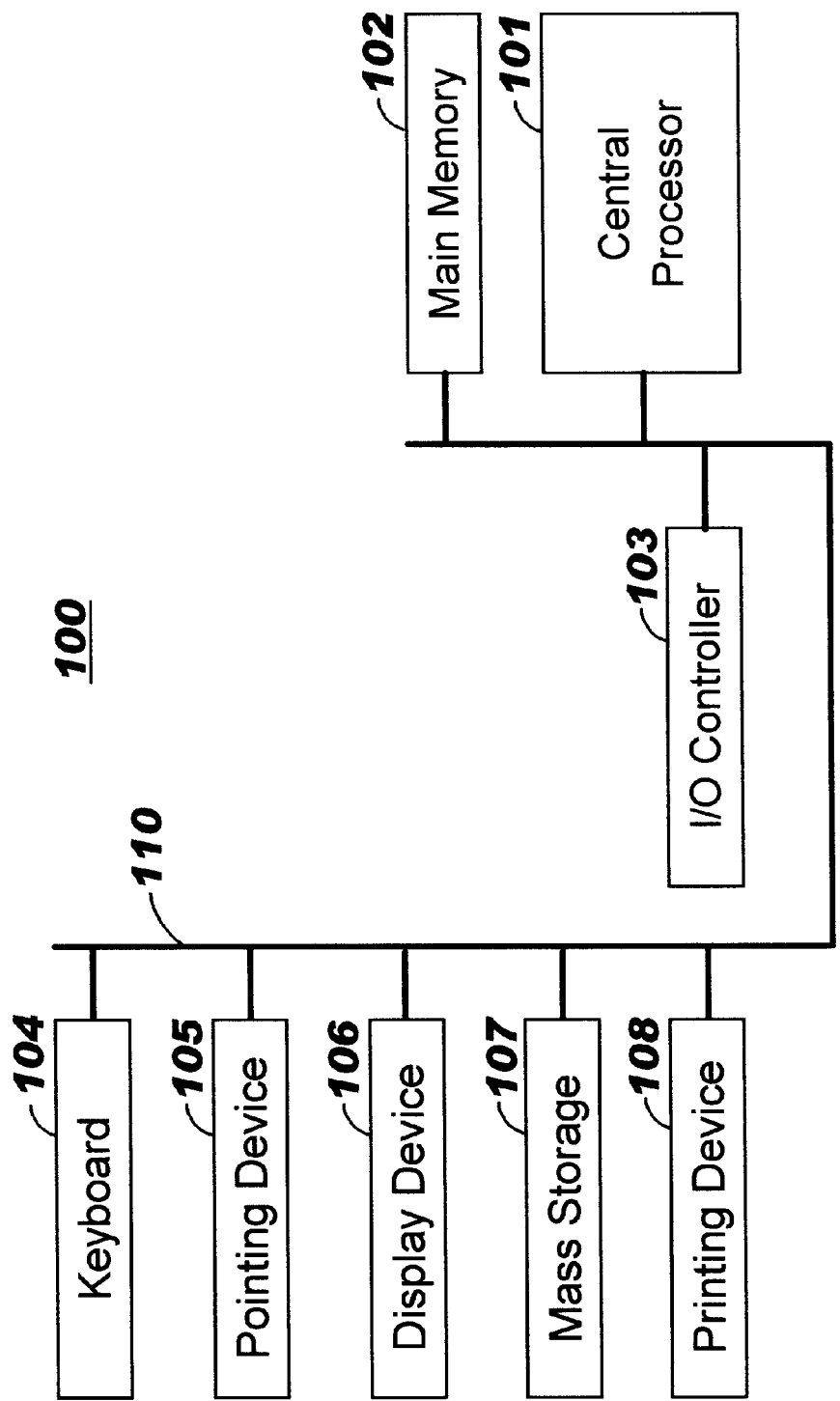
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
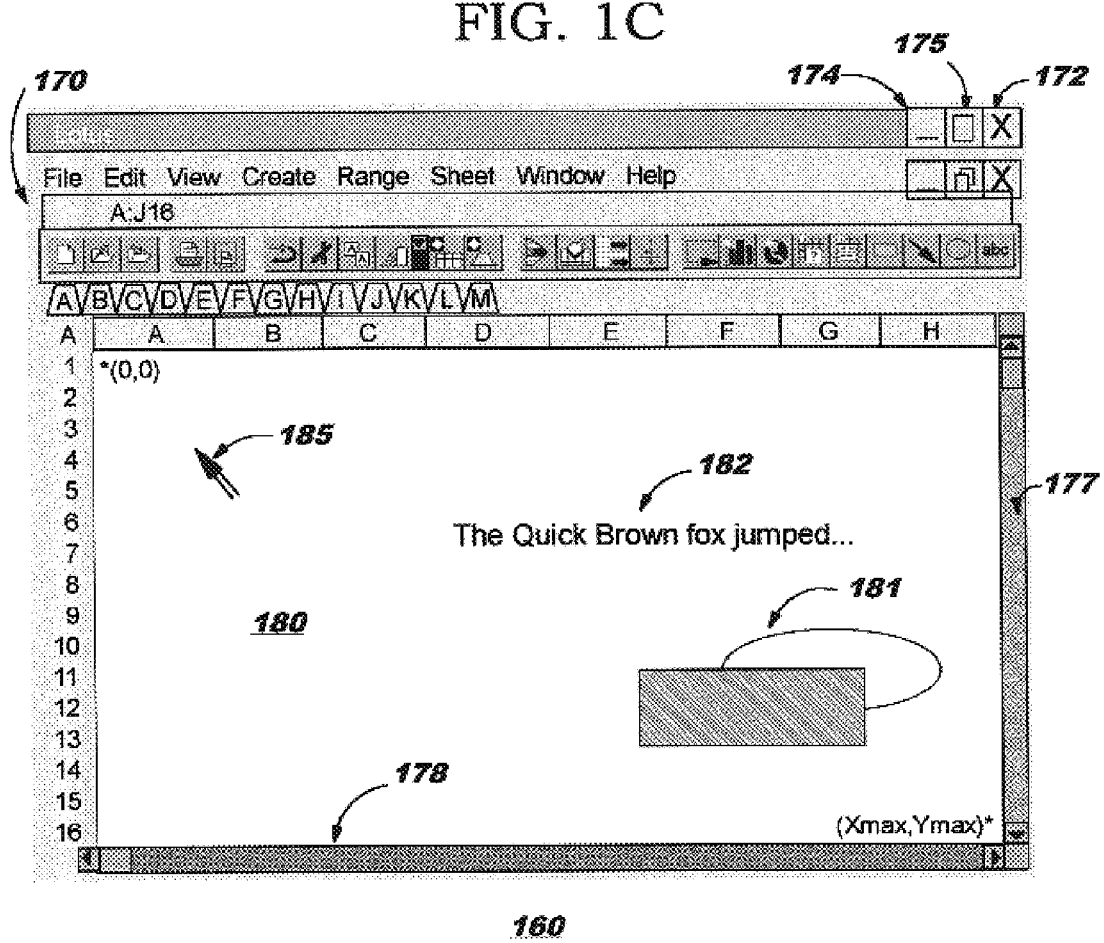
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons." Programming techniques and operations for mouse devices are well documented in the programming and hardware literature; see e.g., Microsoft Mouse Programmer's Reference, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
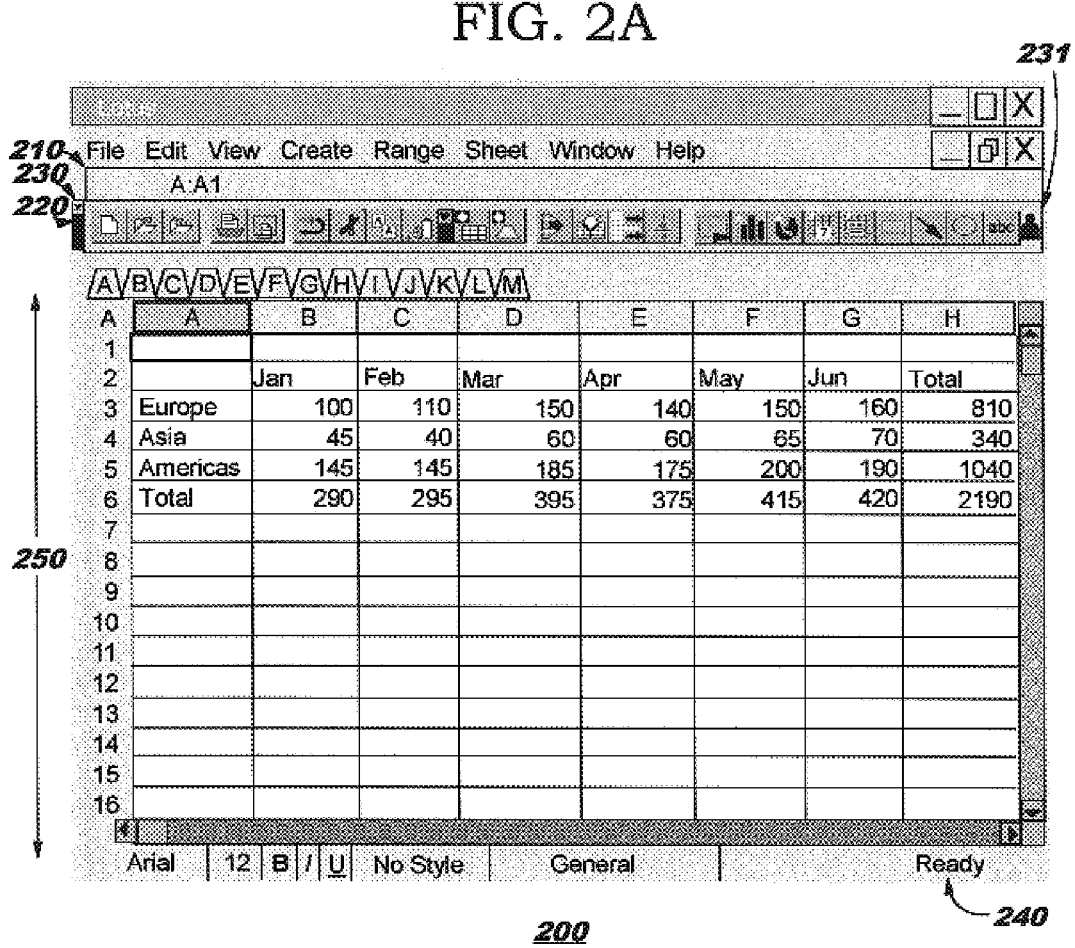
FIG. 2A shows a spreadsheet notebook interface according to the preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
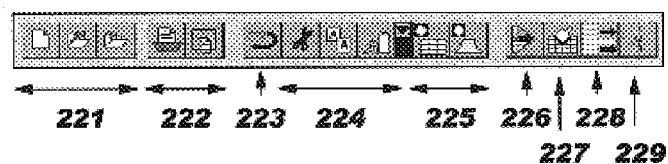
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
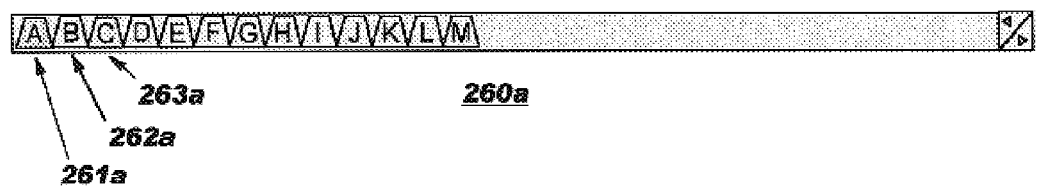
FIGS. 2C and 2D show page identifiers for rapidly accessing and manipulating individual pages of the notebook interface shown in FIG. 2A.
Figure 2D:
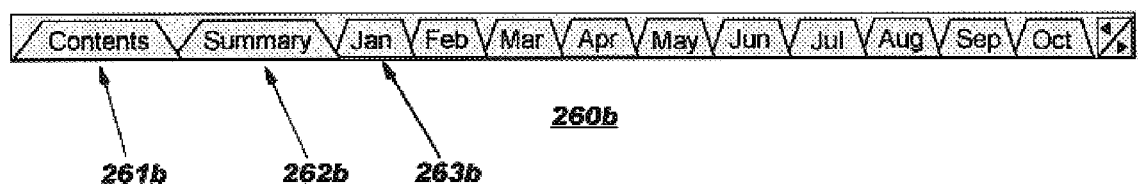

As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management of Named Ranges

A. Introduction

As the power of spreadsheet environments has increased, it is possible to develop complex custom applications solely based on spreadsheets, as opposed to applications developed with general purpose programming languages like C++ or VisualBasic from Microsoft Corporation. This can be achieved thanks to the spreadsheet imbedded tools such as macro languages, script languages and formulas which all manipulate spreadsheet named ranges, whatever these named ranges correspond to single elements of information (a single cell named range), or to multiple elements of information (a complex named range).

In typical spreadsheet based applications, it is common to find tables whose content (or a subset of it) is declared as a named range. Defining such named ranges makes the retrieval of "summary' information from the table easy, for instance, by using database oriented functions able to perform some computations (summing and averaging for instance) for the table entries matching a given set of criteria. Such "summary" information may themselves be located within elements shared with the named range if compliance with some predefined format must be ensured, or simply for readability purpose. When elements are removed from the named range, it may happen that they comprise named range "summary" information. In such a case, this "summary" information is simply destroyed, and any external reference to it will result in an "ERR" cell, so that all the power of the spreadsheet will be lost. With conventional notations, assume that an international company uses a spreadsheet to record the revenue of its branches within a range defined as A:A1.A:D8, as shown in FIG. 3A. With this table structure, each row is associated to a unique branch, and the different branches are sorted by country. Furthermore the last row holds the world-wide revenue by summing all the country revenues. The format used in this table asks to record:

in column A the country where the branch resides, in column B the cumulated revenue of all the branches within a country, in column C the branch location, and in column D the revenue of the branch.

For readability purpose, the information recorded in column A and B must appear once per country. Looking more specifically at the column B, and for instance at the cells A:B2 and A:B5, the cumulated revenue for USA is evaluated thanks to a formula that may take the form @SUM(A:D2 . .A:D4), and the cumulated revenue for United Kingdom is evaluated thanks to a formula that may take the form @SUM(A:D5.A:D7). Doing so, the cells A:B2 and A:B5 appear to hold some "summary" information respectively associated to the ranges A:D2.A:D4 and A:D5 . .A:D7. Finally the global revenue appearing in cell A:B8 is computed as the sum of USA and United Kingdom revenues, for instance with a formula of the kind "+A:B2+A:B5".

Let's assume now that the branch of Denver (recorded in row 4) is closed, so that any reference to it must be removed from the revenue spreadsheet. The classical way to update the revenue table accordingly is simply to remove the row 4. With conventional spreadsheets, the result of this operation corresponds to the updated table, as shown in FIG. 3B. The country revenue for USA has been correctly updated as the cell A:B2 now holds a formula that may take the form @SUM(A:D2 . .A:D3). Indeed the deletion of the row 4 has transformed the initial range A:D2 . .A:D4 into the new range A:D2 . .A:D3. In addition the global revenue appearing in the last row has also been correctly updated. Let's assume now that the branch of London (recorded in row 4) is closed, so that any reference to it must be removed from the revenue spreadsheet. The classic way to update the revenue table accordingly is simply to remove the row 4. With conventional spreadsheets, the result of this operation corresponds to the updated table, as shown in FIG. 3C. The country revenue for United Kingdom was recorded on the spreadsheet element (the row 4) which has been deleted to reflect the London branch close. Thus, this "summary" information is now lost, resulting in an erroneous result in the cell A:B6 holding the global revenue. Indeed this cell now comprises a formula of the kind "+A:B2+ERR", resulting in an ERR result.

The present invention offers a user-friendly solution to this problem by allowing any cell declared as a "Range Summary information" to be preserved, even when the spreadsheet element holding it is removed.

B. Range Summary Manager

In contrast to just-described conventional tools, the present invention provides a more powerful, user-friendly and interactive approach for managing the definition and update of "Range Summary information" in a form of a Range Summary Manager. The manager automatically allows the spreadsheet user to define if and how a cell must behave as a so-called "range summary" cell (as opposed to a so-called "conventional" cell).

The present invention is directed to a method and system for defining and managing within a spreadsheet a new type of cells, referred to in the following as a "Range Summary" cell, as opposed to classical cells referred to as "Conventional" cells.

Conventional cell: In typical spreadsheet programs organized as a 3D (three dimensions) structure (the three axis being the row axis, the column axis and the sheet axis), a conventional cell can be formally defined as the intersection of three plans orthogonal to each axis. Furthermore, there is no required specific relationship between a conventional cell and any range, even if the content of the conventional cell depends on a range.

Range Summary cell: such a cell can also be defined like conventional cells as the intersection of three plans orthogonal to each axis, but a Range Summary cell is uniquely associated to a given range, so that it must "live" as long as the range lives. This mean that the definition of a cell as a Range Summary cell is important as soon as this cell is within a spreadsheet element (for instance a row or column or sheet) shared by the range to which it is associated.

On top of the relationship defined between a Range Summary cell and it's associated range, another "position" information must be specified when a Range Summary cell is defined. Under the example given in FIG. 3B, the cells whose addresses are A:A4 and A:B4 are Range Summary cells associated to the range A:D4 . .A:D6. The position information they have corresponds to the fact that these cells have to be located on the same row as the upper row of the associated range A:D4 . .A:D6, that is in this example the row 4, on the sheet A and respectively in columns A and B. With this position information defined, if the row 4 is now removed (to reflect for instance the closure of the London branch), then the range A:D4 . .A:D6 is updated and becomes the range A:D4 . .A:D5, with 5000 as the content of the cell A:D4 and with 6000 as the content of the cell A:D5. With this range update, the upper row of the range is still the row 4, meaning that the associated Range summary cells will stay with their previous positions, respectively A:A4 and A:B4, even if the row 4 where they were previously contained has been deleted. The resulting table is shown in FIG. 3D which is error free, as opposed to the table shown in FIG. 3C where the global revenue shown in cell A:B6 is in error.

C. Range Summary Cells

In a preferred embodiment, cells that can be specified as Range Summary cells belong to an electronic spreadsheet having a 3D structure, which is organized along three different axis: the row axis, the column axis, and the sheet axis. When selected, cells can be easily identified on the display device 106 within the work area 180 of the window 160 by using some specific cell attributes, such as a font style or font color or background color, etc . . . Similar attributes can also be used on the display device 106 to identify the range associated to the selected Range Summary cell. In a preferred embodiment, the border line of a selected Range Summary cell is set to bold (as for conventional selected cells), but in addition the border line of the selected Range Summary cell is in blinking mode, and the background color of the associated range is set to blinking mode.

In a preferred embodiment, the present invention is used in two steps:

1. The first step occurs when the spreadsheet user decides, based on some criteria not detailed here, whether a given cell deserves to take advantage of the Range Summary manager or not.

The user first selects the relevant cell by using the pointing device 105 or the keyboard 104 and then invokes a specific command called "Associate_Range" thanks to conventional means available in spreadsheet environment, such as (but not limited to) dedicated push-buttons, keyboard entry short cuts, menu or sub-menu entries. The user first specifies the range associated to the selected cell, and then for each of the three axis introduced above (row, column, sheet), the user specifies the relative position of the selected cell with respect to the associated range. At completion of the Associate_Range command, the selected cell border line is set to blinking mode, and the background color of the associated range is set to blinking mode. This same command can also be used to update the definition of a cell already specified as a Range Summary.

During the execution of the Associate_Range command, the spreadsheet program updates an internal table called the "Associate Range Table", aimed to record the relationship between a Range Summary cell and its associated range, and the relative position of the Range Summary cell with respect to the associated.

2. The second step occurs when the user deletes some elements (rows, or columns, or sheets) in the spreadsheet by using conventional means. Conventional spreadsheet programs invokes internal routines aimed to adjust the definition of all the ranges impacted by the deletion of some elements. During the execution of this conventional routine, all impacted ranges are updated, as well as any cross-references to them. With the present invention, the spreadsheet program invokes in addition a specific internal routine referenced to as "Update Range Summary Cells" which further updates the definitions and positions of the range summary cells according to the impact of their associated ranges. As justified later, this second step can also be advantageously invoked in the event where the user introduces new elements (rows, or columns, or sheets) in the spreadsheet by using conventional means.

D. Associate Range Table

The decision to specify which range is associated to a Range Summary cell, and what is the relative position of the Range Summary cell, belongs to the spreadsheet application user. A single repository, called "Associate Range Table", is used to record this information. This Associate Range Table is preferably saved on a non volatile memory (typically but not necessarily, as part of the spreadsheet disk file on the mass storage 107).

Referring now to FIG. 4, the Associated Range Table 400 corresponds to a logical simple structure made of several records 410, each of them associated with a Range Summary cell. Each record includes four fields:

The "Row" field 411 is used for recording the row coordinate of the Range Summary cell. Such a coordinate can be an absolute coordinate (i.e. without any relationship with the associated range), or a relative coordinate depending on the associated range address. In the later case, the relative coordinate is defined thanks to a formula which can take several forms, as illustrated in the following non exhaustive list.

It can be defined as a fixed offset with respect to the row coordinates of the associated range boundaries, such as, for instance, the row coordinate of the top cell of the associated range, incremented by one (meaning that the Range Summary cell will be on the row just bellow the upper row of the associated range). It can be defined as a barycenter of the range boundaries row coordinates, such as, for instance, standing at the bottom of the top third of the range.

It can be a combination of both previous cases, that is a constant offset to a barycenter of the range boundaries row coordinates.

In the Case of the Range Summary cell A:A4 in FIG. 3B (whose content is "United Kingdom"), the "Row" field 411 is defined as being a relative coordinate, that is the row coordinate of the upper boundary of the associated range A:D4 . . A:D6.

The "Column" field 412 is used for recording the column coordinate of the Range Summary cell. Such a coordinate can be an absolute coordinate (i.e. without any relationship with the associated range), or a relative coordinate depending on the associated range address. In the later case, the relative coordinate is defined thanks to a formula which can take several forms, as illustrated in the following non exhaustive list.

It can be defined as a fixed offset with respect to the column coordinates of the associated range boundaries, such as for instance the column coordinate of the leftmost cell of the associated range, incremented by one (meaning that the Range Summary cell will be on the column just at the right of the leftmost column of the associated range).

It can be defined as a barycenter of the range boundaries column coordinates, such as, for instance, standing at the right of the leftmost third of the range.

It can be a combination of both previous cases, that is a constant offset to a barycenter of the range boundaries column coordinates.

In the Case of the Range Summary cell A:A4 in FIG. 3B (whose content is "United Kingdom"), the "Column" field 412 is defined as being an absolute coordinate, whose value is set to A.

The "Sheet" field 413 is used for recording the sheet coordinate of the Range Summary cell. Such a coordinate can be an absolute coordinate (i.e. without any relationship with the associated range), or a relative coordinate depending on the associated range address. In the later case, the relative coordinate is defined thanks to a formula which can take several forms, as illustrated in the following non exhaustive list.

It can be defined as a fixed offset with respect to the sheet coordinates of the associated range boundaries, such as for instance the sheet coordinate of the most forward cell of the associated range, incremented by one (meaning that the Range Summary cell will be on the sheet just behind the foreground sheet of the associated range).

It can be defined as a barycenter of the range boundaries sheet coordinates, such as for instance standing behind the forward third of the range.

It can be a combination of both previous cases, that is a constant offset to a barycenter of the range boundaries sheet coordinates.

In the Case of the Range Summary cell A:A4 in FIG. 3B (whose content is "United Kingdom"), the "Sheet" field 413 is defined as being an absolute coordinate, whose value is set to A.

The "Associated Range" field 414 is used to identify the range associated to the Range summary cell. This identification can be done, for instance, by using the coordinates of this range, or by using its name if it corresponds to a named range.

It is important to notice that the present invention mainly relies on the relation established between the user defined Range Summary cell and the range it is associated to. Both of them have the attributes of conventional electronic spreadsheet objects in the sense that they are automatically adjusted by conventional means when some elements are deleted, but in addition, the Range Summary cells are kept alive, even if they are within the deleted elements, as long as their associated range is not deleted.

In the preferred embodiment, the Associate Range Table is explicitly included within the spreadsheet file itself, but other obvious implementations can instead rely on other means.

E. Associate_Range Method

Figure 5:
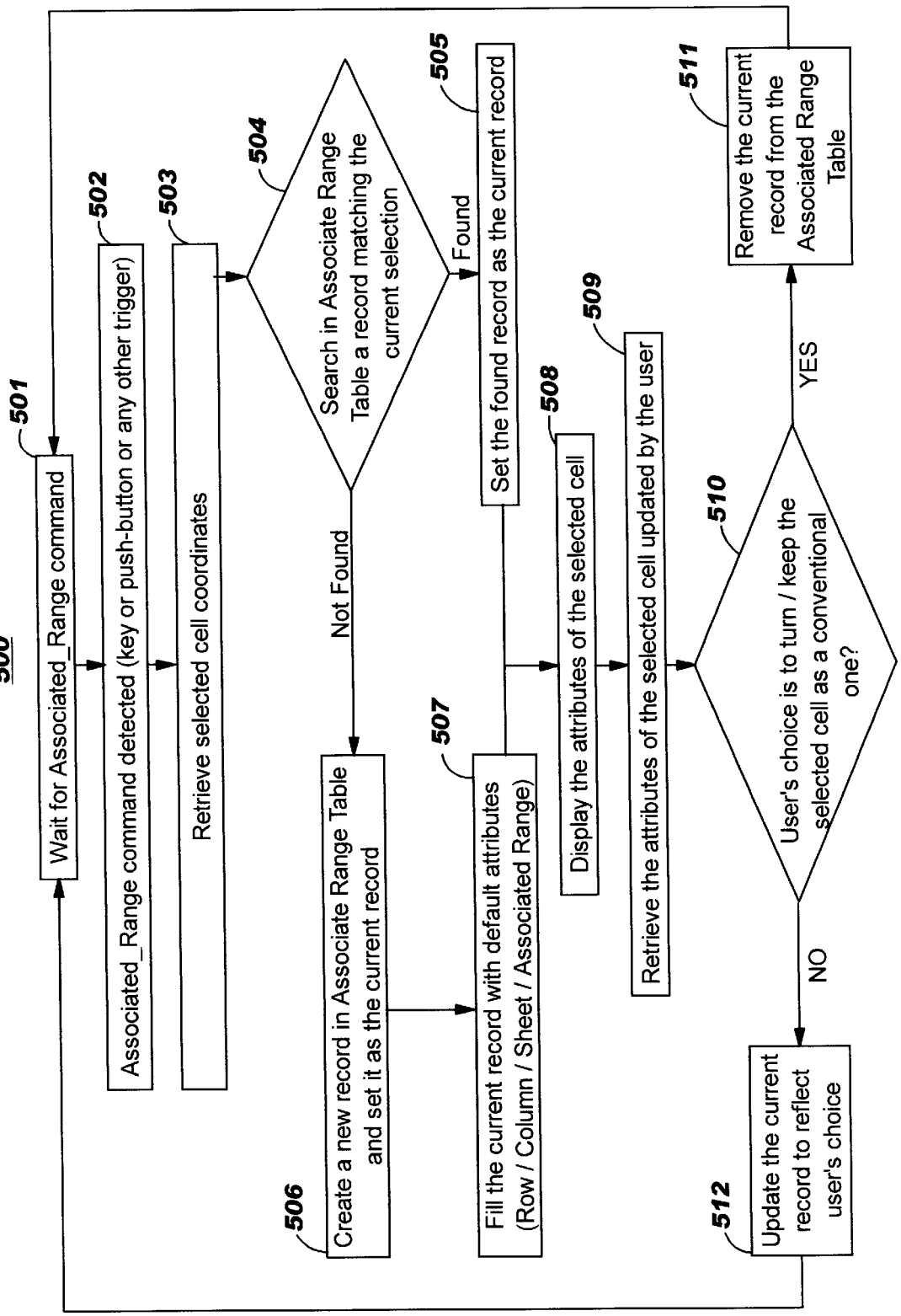
FIG. 5 is a flow chart illustrating a preferred method for specifying how a given cell can take advantage of the present invention.

The method for enabling or disabling a given cell to take advantage of the present invention is summarized in flowchart 500 of FIG. 5. This method can be seen as the processing of the "Associate_Range" command. The method comprises the following steps:

At step 501, the method is in its default state, waiting for an event to initiate the process.

At step 502, an event is detected, as a result of a user action. This action can be, for instance, a specific key combination on the keyboard 104, or the click of the pointing device 105 on a specific button, or any other similar means not further specified here.

At step 503, the coordinates (row, column and sheet) of the currently selected cell are retrieved and memorized.

At step 504, the Associate Range Table 400 is looked up to find any record 410 whose fields 411 (Row), 412 (Column) and 413 (Sheet) take the same values as the corresponding memorized coordinates of the currently selected cell. If such a matching record 410 is found in the Associate Range Table 400, then control is given to step 505, otherwise control is given to step 506.

At step 505, the record 410 found during step 504 is set as the current record of the Associate Range Table 400. Control is then given to step 508.

At step 506, a new record 410 is created in the Associate Range Table 400, and this record is set as the current record of the Associate Range Table 400.

At step 507, the current record 410 is filled with default attributes. In a preferred embodiment of the present invention, the default values of the fields 411, 412 and 413 (respectively Row, Column and Sheet) correspond to the value of the respective coordinates of the currently selected cell, and the default value of the field 414 (Associated Range) is set to the coordinates of the previously selected range, which can be memorized by classical means.

At step 508, the different fields of the current record 410 of the Associate Range Table 400 are displayed to the user to let him modify them according to his wishes, by using conventional user-interface means, such as, but not limited to, navigation with the pointing device 105 within menus and sub-menus, or some specific combination of keys on the keyboard 104. During this step, the user can set or update the range associated to the currently selected cell, the relationships giving the cell coordinates as a function of the associated range coordinates, and also an indicator to have the currently selected cell defined as a Range Summary cell.

At step 509, the attributes of the selected Range Summary cell, as updated by the user during the step 508, are retrieved. They corresponds to the range associated to the currently selected cell, to the coordinates (row, column, sheet) of the currently selected cell, and to the indicator to define or not the currently selected cell as a Range Summary cell.

At step 510, a test is done on the above mentioned indicator to determine if the user wishes or not to set or keep the currently selected cell as a conventional cell (as opposed to a Range Summary cell). If it is the case, the control is given to step 511. Otherwise, control is given to step 512.

At step 511, the current record 410 of the Associate Range table 400 is removed, and then control is given back to the initial step 501, for processing any further new command.

At step 512, the different fields of the current record 410 of the Associate Range table 400 are updated to reflect the user's choice. They correspond to the fields 411, 412, 413 and 414 where are respectively recorded the relationships providing the row coordinate of the currently selected Range Summary cell, the column coordinate of the currently selected Range Summary cell, the sheet coordinate of the currently selected Range Summary cell, and the range associated with the currently selected Range Summary cell. Then control is given back to the initial step 501, for processing any further new command.

F. Update_Range_Summary_Cells Method

Figure 6:
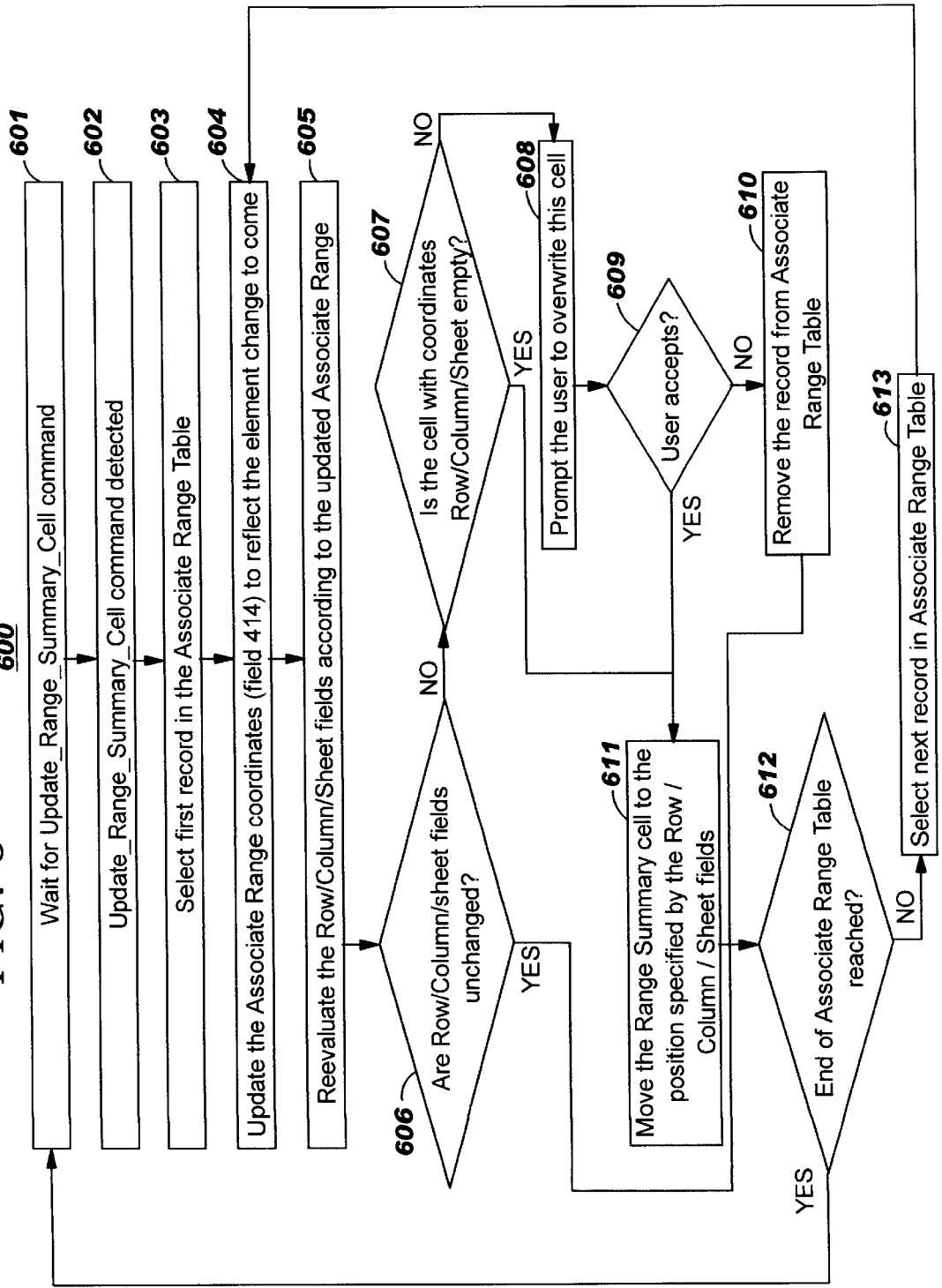
FIG. 6 is a flow chart illustrating a preferred method for updating a Range Summary cell upon the deletion or introduction of elements (row or column or sheet) according to the present invention.

The method according to the present invention for updating a Range Summary cell upon the deletion of elements such as rows, columns and sheets is summarized in flowchart 600 of FIG. 6. This method can be seen as an extension of the conventional methods which are applied to conventional cells, and which only update their coordinates to reflect the deletion of elements. This method has to be invoked before the conventional ones, as it corresponds to some kind of "pre-processing" of the Range Summary cells. The method comprises the following steps".

At step 601, the method is in its default state, waiting for an event to initiate the following process.

At step 602, the event is detected, as a result of a call to the routine implementing the Update_Range_Summary Cell method, before invoking the conventional routines updating the conventional cells upon the deletion of elements in the spreadsheet.

At step 603, the first record 410 of the Associate Range Table 400 is selected and becomes the current record.

At step 604, the coordinate of the Associated Range (as given by field 414) are updated to reflect the element deletion to come. For instance if an associated range is defined between rows 10 and 20 included, and if the rows 15 to 17 are deleted, then the associated range field 414 is defined at the end of this step between rows 10 and 17 included.

At step 605, the coordinates given by the fields 411, 412 and 413 (respectively Row, Column and Sheet) are updated according to the new value taken by the field 414, as a result of the step 604. For instance, if the row definition 411 specifies to be at the bottom row of the associated range (it was row 20 as the associated range was defined between rows 10 and 20 included), then the field 411 takes the value 17 because the associated range has been redefined between rows 10 and 17 included during the step 604.

At step 606, a test is performed to check if the three fields 411, 412 and 413 (respectively Row, Column and Sheet) have kept their values unchanged as a result of the step 605. If it is the case, then control is given to step 612. Otherwise control is given to step 607.

At step 607, a test is performed to check if the cell whose three coordinates match the values given by the three fields 411, 412 and 413 (respectively Row, Column and Sheet), is empty. If it is the case, then control is given to step 611. Otherwise control is given to step 608.

At step 608, the user is prompted by using conventional user-interface means, such as, but not limited to navigation with the pointing device 105 within menus and sub-menus, or some specific combination of keys on the keyboard 104, to determine if he/she accepts that the non empty cell whose three coordinates match the values given by the three fields 411, 412 and 413 (respectively Row, Column and Sheet), can be overwritten by the content of the Range Summary cell corresponding to the current record 410 of the Associated Range Table 400.

At step 609, a test is performed on the user choice. If the user accepts that the above mentioned cell be overwritten, then control is given to step 611. Otherwise control is given to step 610.

At step 610, the current record 410 of the Associate Range Table 400 is removed. Indeed it corresponds to the case where the user refuses a Range Summary cell overwrite of an existing non empty cell: in that case the Range Summary cell disappears. Control is then given to step 612.

At step 611, the Range Summary cell is moved from its current position to the new one specified by the new values taken by the three coordinate fields 411, 412 and 413 (respectively Row, Column and Sheet) resulting from the step 605.

At step 612, a test is performed to check if all the records 410 of the Associate Range Table 400 have been treated. If it is the case, then control is given back to the initial step 601, for processing any further new command. Otherwise control is given to step 613.

At step 613, the next record 410 in the Associate Range Table 400 is selected so that the current record becomes the one following the previous one. Then control is given back to step 604 for processing the new current record.

It must be understood that the previously described method is followed by the conventional one(s) in charge of deleting the relevant spreadsheet elements. As a result of such spreadsheet element removal conventional methods, the Range Summary cell address, as well as the address of its associated range, may get updated, so that the pieces of information 411, 412, 413 and 414 within records 410 of the Associate Range Table 400 are also updated.

Alternate Embodiments

While the invention has been particularly shown and described with reference to a preferred embodiment, it will be understood that various changes in form and detail may be made therein without departing from the spirit, and scope of the invention.

The improved Range Summary cell management method and system according to the present invention may be used advantageously in those environments where elements of information are organized as multidimensional tables having more than three dimensions.

The improved Range Summary cell management method and system according to the present invention may be used advantageously on a range of cells, as opposed to a single cell. In such a case, all the individual cells pertaining to a Range Summary Range, take advantage of the present invention.

The improved Range Summary cell management method and system according to the present invention may be advantageously extended by invoking the Update_Range_Summary_Cells method in the event new elements (Rows, Columns or Sheets) are introduced in an electronic spreadsheet. In such a case, this method may result in updating the position of the Range Summary cells whose associated ranges are impacted by the introduction of the new elements.

The improved Range Summary cell management method and system according to the present invention may be advantageously extended by allowing, at step 610 of the Update_Range_Summary_Cells method, the user to redefine the attributes of the Range Summary cell, according to the Associate Range method, so that the cell identified at step 607 be not overwritten.

What is claimed is:

1. A method of processing a range summary cell in a multi-dimensional spreadsheet comprising a plurality of cells identified by a cell address along each dimension, said method comprising the steps of:

defining one or a plurality of range summary cells by specifying in a table for each range summary cell:
   a range summary cell address;
   a cell range address identifying an associated cell range, wherein said range summary cell address comprises a function of the specified cell range address;

in response to a user request for adding or deleting a spreadsheet element sharing a common cell address along at least one dimension with the one or a plurality of cell ranges associated in the table with the one or a plurality of range summary cells while preserving the one or plurality of range summary cells previously defined:
   for each cell range sharing a common cell address with said spreadsheet element along at least one common dimension, updating in the table the cell range address of the cell range associated with the range summary cell according to the user request; and for each range summary cell associated with said cell range:
      updating in the table, the range summary cell address according to the updated cell range address;
      moving in the spreadsheet, the range summary cell according to the updated range summary cell address maintaining a pre-determined positional relationship between the range summary cell and the associated cell range;
      adding or deleting the spreadsheet element according to the user request;
   for each said cell range sharing in the request a common cell address with said spreadsheet element along at least one common dimension,
updating in the table, the cell range address after the addition or the deletion of the spreadsheet element; and for each range summary cell associated with said cell range:
   updating in the table, the range summary cell address according to the updated cell range address.

2. The method according to claim 1, wherein each cell address comprises an address for each dimension of the spreadsheet, preferably a row address, a column address and a sheet address.

3. The method according to claim 2, wherein said spreadsheet element is a cell range of one or a plurality of dimensions.

4. The method according to claim 3, wherein the step of moving in the spreadsheet, the one or a plurality of range summary cells according to the updated range summary cell address comprises the steps of:

determining whether or not the updated range summary cell address is already used in the spreadsheet to record information;
   determining whether or not the recorded information can be overwritten if the updated range summary cell address is already used; and
   moving in the spreadsheet the one or a plurality of range summary cells according to the updated range summary cell address if the recorded information can be overwritten.

5. The method according to claim 4, wherein the step of determining whether or not the recorded information can be overwritten comprises the step of:

prompting the user to overwrite or not to overwrite the recorded information.

6. The method according to claim 5, wherein the step of prompting the user not to overwrite or to overwrite the recorded information, comprises the further step of:

prompting the user to update or not to update the range summary cell address.

7. The method according to claim 6, comprising the further step of:

updating, in the table, specifications of the one or a plurality of range summary cells previously defined.

8. The method of claim 1, wherein the table has an associated range table for specifying a relational position of the range summary cells.

9. The method of claim 1, wherein the defining step includes defining positional information to position the range summary cells in relation to the associated cell range.

10. The method of claim 9, wherein the positional information maintains the position of the range summary cells in relation to the associated cell range when at least one cell of the associated cell range is added or deleted.

11. The method of claim 1, wherein the defining step includes defining a position of the one or a plurality of range summary cells as at least one of an absolute coordinate and a relational coordinate.

12. The method of claim 11, wherein the defining the position as the relational coordinate includes at least one of defining the position as a fixed offset to row coordinates of an associated range boundary and defining the position as a barycenter of the associated range boundaries row coordinates.

13. The method of claim 11, wherein the defining the position as the relational coordinate includes at least one of defining the position as a fixed offset to column coordinates of an associated range boundary and defining the position as a barycenter of the associated range boundaries column coordinates.

14. A system for processing a range summary cell in a multi-dimensional spreadsheet comprising a plurality of cells identified by a cell address along each dimension, said system comprising:

means for defining one or a plurality of range summary cells by specifying in a table for each range summary cell:

a range summary cell address;

a cell range address identifying an associated cell range, wherein said range summary cell address comprises a function of the specified cell range address;

in response to a user request for adding or deleting a spreadsheet element means for sharing a common cell address along at least one dimension with the one or a plurality of cell ranges associated in the table with the one or a plurality of range summary cells while preserving the one or plurality of range summary cells previously defined:

for each cell range sharing a common cell address with said spreadsheet element along at least one common dimension, means for updating in the table the cell range address of the cell range associated with the range summary cell according to the user request; and for each range summary cell associated with said cell range:

means for updating in the table, the range summary cell address according to the updated cell range address;

means for moving in the spreadsheet, the range summary cell according to the updated range summary cell address maintaining a pre-determined positional relationship between the range summary cell and the associated cell range;

means for adding or deleting the spreadsheet element according to the user request;

for each said cell range sharing in the request a common cell address with said spreadsheet element along at least one common dimension, means for updating in the table, the cell range address after the addition or the deletion of the spreadsheet element; and for each range summary cell associated with said cell range:

means for updating in the table, the range summary cell address according to the updated cell range address.

15. The system of claim 14, wherein the table has an associated range table for specifying a relational position of the range summary cells.

16. The system of claim 14, wherein the means for defining includes defining positional information to position the range summary cells in relation to the associated cell range so that the position of the range summary cells are maintained in relation to the associated cell range during deletion of cells or addition of new cells within the associated cell range.

17. The system of claim 16, wherein the positional information maintains the position of the range summary cells in relation to the associated cell range when at least one cell of the associated cell range is added or deleted.

18. A computer readable medium comprising instructions adapted for processing a range summary cell in a multi dimensional spreadsheet comprising a plurality of cells identified by a cell address along each dimension, said computer readable medium comprising:

computer readable means for defining one or a plurality of range summary cells by specifying in a table for each range summary cell:

a range summary cell address;

a cell range address identifying an associated cell range, wherein said range summary cell address comprises a function of the specified cell range address;

in response to a user request for adding or deleting a spreadsheet element, computer readable means for sharing a common cell address along at least one dimension with the one or a plurality of cell ranges associated in the table with the one or a plurality of range summary cells while preserving the one or plurality of range summary cells previously defined:

for each cell range sharing a common cell address with said spreadsheet element along at least one common dimension, computer readable means for updating in the table the cell range address of the cell range associated with the range summary cell according to the user request; and for each range summary cell associated with said cell range:

computer readable means for updating in the table, the range summary cell address according to the updated cell range address;

computer readable means for moving in the spreadsheet, the range summary cell according to the updated range summary cell address maintaining a pre-determined positional relationship between the range summary cell and the associated cell range;

computer readable means for adding or deleting the spreadsheet element according to the user request;

for each said cell range sharing in the request a common cell address with said spreadsheet element along at least one common dimension, computer readable means for updating in the table, the cell range address after the addition or the deletion of the spreadsheet element; and for each range summary cell associated with said cell range:

computer readable means for updating in the table, the range summary cell address according to the updated cell range address.

* * * * *